(12) United States Patent
Wang et al.

(10) Patent No.: US 8,616,380 B2
(45) Date of Patent: Dec. 31, 2013

(54) REVERSE OSMOSIS COMPOSITE MEMBRANES FOR BORON REMOVAL

(75) Inventors: Hua Wang, Clifton Park, NY (US); David Allen Olson, Minneapolis, MN (US); Jiang Ji, North Billerica, MA (US); Michael Todd Luttrell, Clifton Park, NY (US); Gary William Yeager, Rexford, NY (US); Joseph Anthony Suriano, Clifton Park, NY (US); Lawrence Charles Costa, Mansfield, MA (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/527,640

(22) Filed: Jun. 20, 2012

(65) Prior Publication Data

US 2012/0255909 A1    Oct. 11, 2012

Related U.S. Application Data

(63) Continuation of application No. 12/550,990, filed on Aug. 31, 2009.

(51) Int. Cl.
*B01D 71/56* (2006.01)
*B01D 71/66* (2006.01)

(52) U.S. Cl.
USPC .................. 210/500.38; 210/500.41; 210/654

(58) Field of Classification Search
USPC .............................. 210/500.38, 500.41, 654
See application file for complete search history.

(56) References Cited

U.S. PATENT DOCUMENTS

| | | | |
|---|---|---|---|
| 3,951,920 A * | 4/1976 | Senoo et al. ................. | 210/654 |
| 3,980,605 A | 9/1976 | Steigelmann et al. | |
| 4,005,012 A | 1/1977 | Wrasidlo | |
| 4,259,183 A * | 3/1981 | Cadotte .......................... | 210/654 |
| 4,302,336 A | 11/1981 | Kawaguchi et al. | |
| 4,877,528 A | 10/1989 | Friesen et al. | |
| 4,950,404 A | 8/1990 | Chau | |
| 5,173,191 A * | 12/1992 | Black ............................ | 210/654 |
| 5,250,185 A | 10/1993 | Tao et al. | |
| 5,582,725 A | 12/1996 | McCray et al. | |
| 5,674,398 A | 10/1997 | Hirose et al. | |
| 5,693,227 A | 12/1997 | Costa | |
| 6,821,430 B2 | 11/2004 | Andou et al. | |
| 7,279,097 B2 | 10/2007 | Tomioka et al. | |
| 2003/0121857 A1 * | 7/2003 | Kurth et al. ................... | 210/651 |
| 2003/0141242 A1 | 7/2003 | Kurth et al. | |
| 2004/0050800 A1 | 3/2004 | Ito et al. | |
| 2004/0222146 A1 | 11/2004 | Hirose et al. | |
| 2006/0006559 A1 | 1/2006 | Nakagawa et al. | |
| 2006/0065598 A1 | 3/2006 | Comstock | |
| 2006/0169634 A1 | 8/2006 | Hiro et al. | |
| 2007/0022796 A1 | 2/2007 | Hayashi | |
| 2007/0039873 A1 | 2/2007 | Kurth et al. | |
| 2007/0039874 A1 | 2/2007 | Kniajanski et al. | |
| 2007/0227966 A1 | 10/2007 | Koo et al. | |
| 2008/0023712 A1 | 1/2008 | Mueller et al. | |
| 2008/0277342 A1 | 11/2008 | Kurth et al. | |

FOREIGN PATENT DOCUMENTS

| | | |
|---|---|---|
| EP | 1136116 B1 | 12/2004 |
| EP | 1839731 B1 | 2/2011 |
| EP | 1468964 B1 | 8/2011 |
| GB | 2390042 A | 12/2003 |
| JP | 63007807 A | 1/1988 |
| JP | 7171362 A | 7/1995 |
| JP | 7171363 A | 7/1995 |
| WO | WO0189654 A2 | 11/2001 |
| WO | WO2006051888 A1 | 5/2006 |

OTHER PUBLICATIONS

Trushinski et al., Polysulfonamide thin-film composite reverse osmosis membranes, 1998, Elsevier, Journal of Membrane Science, 143, pp. 181-188.*
Trussell et al., "Boron Removal and Reverse Osmosis", http://www.trusselltech.com, 11 pages, Feb. 2005.
"1,3-Benzenedisulfonyl Chloride", Chemical Book, pp. 1-3, Accessed Jan. 24, 2012.
"4-Nitrobenzenesulfonyl Chloride", Chemical Book, pp. 1-3, Accessed Jan. 24, 2012.

* cited by examiner

*Primary Examiner* — David C Mellon
(74) *Attorney, Agent, or Firm* — Jason K. Klindtworth

(57) ABSTRACT

Improved methods for reducing boron concentration in seawater or brackish water, while simultaneously maintaining or improving the salt rejection of membrane and flow performance of polyamide reverse osmosis (RO) membranes include contacting the water with a composite membrane comprising moieties derived from an aromatic sulfonyl halide, a heteroaromatic sulfonyl halide, a sulfinyl halide; a sulfenyl halide; a sulfuryl halide; a phosphoryl halide; a phosphonyl halide; a phosphinyl halide; a thiophosphoryl halide; a thiophosphonyl halide, an isocyanate, a urea, a cyanate, an aromatic carbonyl halide, an epoxide or a mixture thereof.

5 Claims, No Drawings

REVERSE OSMOSIS COMPOSITE MEMBRANES FOR BORON REMOVAL

CROSS REFERENCE TO RELATED APPLICATIONS

This application is a continuation of and claims priority from U.S. application Ser. No. 12/550,990, filed on Aug. 31, 2009, the entire contents of which is incorporated herein by reference.

BACKGROUND

Reverse osmosis (RO) membrane desalination uses membrane technology to transform seawater and brackish water into fresh water for drinking, irrigation, and industrial applications. Such processes require substantially less energy than do thermal desalination processes such as multi-stage flash, and so, reverse osmosis membrane technology is increasingly used to produce fresh water from seawater or brackish water.

Reverse osmosis is the process of forcing a solvent from a region of high solute concentration through a membrane to a region of low solute concentration by applying a pressure in excess of the osmotic pressure. This is the reverse of an osmosis process, which is the natural movement of solvent from an area of low solute concentration, through a membrane, to an area of high solute concentration when no external pressure is applied. The membrane here is semipermeable, meaning it allows the passage of solvent but not of solute. The membranes used for reverse osmosis have a dense barrier layer in the polymer matrix where most separation occurs. The membrane is designed to allow only water to pass through this dense layer while preventing the passage of solutes such as salts. The reverse osmosis process requires that a high pressure be exerted on the high concentration side of the membrane, usually 2-17 bar (30-250 psi) for fresh and brackish water, and 40-70 bar (600-1000 psi) for seawater, which has around 24 bar (350 psi) natural osmotic pressure which must be overcome.

Over the years, better membrane technologies and energy recovery devices have made reverse osmosis more affordable and efficient. However, the RO process has not been very effective in the removal of neutral contaminants such as boron despite its capacity to efficiently remove up to 99.7% of ionic species.

Seawater in general has a boron concentration of 4 to 5 mg/L. Depending on location and seasonal effects, the boron concentration can reach up to 7 mg/L, e.g. in the Arabian Gulf. Toxicological effects of human exposure to excess boron, mostly reproductive and developmental, are well documented. Excess boron also harmful to plant growth; deleterious effects include massive leaf damages, premature ripening, and reduced crop yields.

In aqueous environments, at acidic and neutral pH, boron is mainly present as undissociated boric acid. Reverse osmosis membrane is better at removing charged species over uncharged species due to the larger apparent size of hydrated charged species. Uncharged boric acid has a molecular diameter of 2.75 Å and a molecular volume of 71.5 Å$^3$, which is similar to urea (75.3 Å$^3$) and other small nonelectrolytes. Thus, boric acid is significantly smaller than hydrated sodium (3.58 Å) and chloride (3.32 Å) ions, making the removal of boron significantly more difficult than sodium chloride salt.

Thin films of cross-linked aromatic polyamide RO membranes are typically composed of two types of pores, network pores having radii of about 1-3 Å, and aggregate pores, having radii of about 3.5-4.5 Å. The radius of uncharged boric acid (2.75 Å) is close to that of the network pores and substantially less than that of the aggregated pores. As a result, it is difficult for a RO membrane desalination process to achieve an average boron rejection over 90%, which is typically required to produce a permeate that meets the requirements of the many applications. This has led to the adoption of procedures such as repeating the RO membrane treatment process twice, or mixing treated water with low boron concentration water from other sources. Although these additional treatment steps lead to reduced boron concentration, they increase costs substantially.

In recent years, specialized seawater reverse osmosis (SWRO) membranes for boron removal have been introduced. However, even with these membranes, it has been difficult for a single-pass full-scale RO process to reduce the boron level to below 0.5 mg/L, while achieving required system recovery, unless an additional treatment step is employed. For example, the SWRO plant in Ashkelon, Israel, uses a 4-stage cascade RO design to meet a boron specification of <0.3 mg/L. U.S. Pat. No. 7,279,097, assigned to Toray Industries Inc., discloses a method of treating reverse osmosis membranes with aliphatic amines and aliphatic acid halide for improving boron rejection of the membranes. Aliphatic acid halides disclosed include "methanesulfonyl chloride, acetyl chloride, propionyl chloride, butyryl chloride, oxalyl chloride, malonic acid dichloride, succinic acid dichloride, maleic acid dichloride, fumaric acid dichloride, chlorosulfonylacetyl chloride, and N,N-dimethylaminocarbonyl chloride". However, there remains a need for even better methods for making new seawater and brackish membrane products with high boron rejection and salt rejection performance.

BRIEF DESCRIPTION

The present invention relates to improved methods for reducing boron concentration and improving flow performance of polyamide reverse osmosis (RO) membranes, while simultaneously maintaining or improving the salt rejection of membrane Briefly, in one aspect, the present invention relates to reverse osmosis methods for reducing boron concentration in water containing boron, the method comprising contacting the water with a composite membrane comprising moieties derived from an aromatic sulfonyl halide, a heteroaromatic sulfonyl halide, a sulfinyl halide; a sulfenyl halide; a sulfuryl halide; a phosphoryl halide; a phosphonyl halide; a phosphinyl halide; a thiophosphoryl halide; a thiophosphonyl halide, an isocyanate, a urea, a cyanate, an aromatic carbonyl halide, an epoxide or a mixture thereof.

In another aspect, the present invention relates to reverse osmosis methods for preparing a composite membrane by contacting under interfacial polymerization conditions an organic solution comprising a polyacid halide with an aqueous solution that includes a polyamine to form a polyamide membrane. The contacting step is carried out on a surface of a porous base membrane, and the organic solution further includes an aryl sulfonyl halide. The composite membranes so prepared may be used for reducing boron concentration, and typically display good boron rejection performance.

DETAILED DESCRIPTION

The present invention relates to reverse osmosis methods for reducing boron concentration in seawater or brackish water containing at least 5 ppm boron, in a single step, by at least 90%, preferably by at least 95% in a single step, and more preferably by at least 96% in a single step. pH of the water is typically less than or equal to about 8.5. Reverse osmosis processes are typically operated at pressures ranging from 2-17 bar (30-250 psi) for fresh and brackish water, and 40-70 bar (600-1000 psi) for seawater.

In the reverse osmosis methods of the present invention, the seawater or brackish water is treated, by contacting it with a composite membrane comprising moieties derived from an aromatic sulfonyl halide, a heteroaromatic sulfonyl halide, a sulfinyl halide; a sulfenyl halide; a sulfuryl halide; a phosphoryl halide; a phosphonyl halide; a phosphinyl halide; a thiophosphoryl halide; a thiophosphonyl halide, an isocyanate, a urea, a cyanate, an aromatic carbonyl halide, an epoxide or a mixture thereof. In some embodiments, the moieties are derived from an aromatic sulfonyl halide, particularly 4-nitrobenzenesulfonyl chloride, 1,3-benzenedisulfonyl chloride, or 4-cyano benzenesulfonyl chloride. The composite membrane may additionally include an additional layer of cross-linked hydrophilic polymer such as polyvinyl alcohol (PVA) coated on the separating layer.

The term "composite membrane" refers to thin film composite (TFC) semipermeable membranes composed of a separating functional layer formed on a porous substrate film. The separating functional layer is thin in order to maximize membrane flux performance, and is formed on a porous support or base membrane to provide mechanical strength. Examples of TFC membranes that may be used in the methods of the present invention include, but are not limited to, reverse osmosis membranes composed of a polyamide separating functional layer formed on a porous polysulfone support, nanofiltration membranes, and other thin film composite membrane.

The composite membranes for use in the reverse osmosis methods of the present invention may be prepared by post-treatment of a TFC membrane, particularly a polyamide TFC membrane with an aromatic sulfonyl halide, a heteroaromatic sulfonyl halide, a sulfinyl halide; a sulfenyl halide; a sulfuryl halide; a phosphoryl halide; a phosphonyl halide; a phosphinyl halide; a thiophosphoryl halide; a thiophosphonyl halide, an isocyanate, a urea, a cyanate, an aromatic carbonyl halide, and/or an epoxide.

Alternately, the composite membranes may be prepared by in-situ reaction of the same compounds during fabrication of the membrane by interfacial polymerization. Accordingly, in another aspect, the present invention relates to methods for preparing a composite membrane that may be used in reverse osmosis methods for reducing boron concentration. An organic solution including a polyacid halide is contacted under interfacial polymerization conditions, on a surface of a porous base membrane, with an aqueous solution including a polyamine to form a polyamide membrane. The organic solution further includes an aryl sulfonyl halide, heteroaromatic sulfonyl halide, a sulfinyl halide; a sulfenyl halide; a sulfuryl halide; a phosphoryl halide; a phosphonyl halide; a phosphinyl halide; a thiophosphoryl halide; a thiophosphonyl halide, an isocyanate, a urea, a cyanate, an aromatic carbonyl halide, an epoxide, or a mixture thereof, preferably an aryl sulfonyl halide, more preferably 1,3-benzenedisulfonyl chloride or 1,3,6-naphthalenetrisulfonyl chloride. The aryl sulfonyl halide may be present in an amount ranging from about 0.01% to about 2% by weight.

The organic solution may additionally include a $C_3$-$C_8$ cyclic carbonyl compound. The $C_3$-$C_8$ cyclic carbonyl compound may be a cyclic ketone having from three to eight carbon atoms for example cyclooctanone, cycloheptanone, 2-methylcyclohexanone, cyclohexanone, cyclohexene-3-one, cyclopentanone, cyclobutanone, 3-ketotetrahydrofuran, 3-ketotetrahydrothiophene, and 3-ketoxetane; a cyclic ester having from three to eight carbon atoms, for example 2-methyl caprolacone, caprolactone, valerolactone, butyrolactone, diketene, and propiolactone; or a $C_3$-$C_8$ cyclic carbonate, for example ethylene carbonate, propylene carbonate, 1,2-butanediol carbonate, 1,2-penanediol carbonate, 1,2-hexanediol carbonate, and 1,2-heptanediol carbonate. In one embodiment, the cyclic carbonyl compound is cyclohexanone.

The $C_3$-$C_8$ cyclic carbonyl compound may be present in an amount corresponding to from about 0.1 to about 3.5 weight percent of the total weight of the organic solution. In another embodiment, the $C_3$-$C_8$ cyclic carbonyl compound is present in an amount corresponding to from about 0.5 to about 2.5 weight percent of the total weight of the organic solution. In yet another embodiment, the organic solution comprises the $C_3$-$C_8$ cyclic carbonyl compound in an amount corresponding to from about 1 to about 1.5 weight percent of the total weight of the organic solution.

Suitable porous base membranes include those composed of polysulfone, polyethersulfone, polyester, polyphenyleneoxide, polyphenylenesulfide, polyvinyl chloride, polyacrylonitrile, polyvinylidine fluoride, polytetrafluoroethylene, polycarbonate, polyimide, polyetherimide, polyetherketone, and polyetherether-ketone. A wide variety of suitable porous base membranes are either available commercially or may be prepared using techniques known to those of ordinary skill in the art. In one embodiment, a porous base membrane which is a polysulfone film is used. In another embodiment, the porous base membrane is a porous polyethersulfone film.

Interfacial polymerization includes contacting an aqueous solution of one or more polyamine monomers onto a porous support membrane; followed by coating an organic solution, generally in an aliphatic solvent, containing one or more polyacid halide monomers. At the interface of the two solution layers, which lies near the surface of the porous support, a thin film polymer is formed from condensation of the electrophilic and nucleophilic monomers and is adherent to the porous support. The rate of thin film formation may be accelerated by heating or addition of catalysts. The polyacid halide monomer on contact with the polyamine monomer reacts on the surface of the porous base membrane to afford a polyamide disposed on the surface of the porous support membrane. Suitable polyacid chlorides include trimesoyl chloride, terephthaloyl chloride, isophthaloyl chloride, succinic acid diacid chloride, glutaric acid diacid chloride, adipic acid diacid chloride, trans-cyclohexane-1,4-dicarboxylic acid diacid chloride, cis-cyclohexane-1,4-diarboxylic acid diacid chloride, the triacid chloride of Kemp's triacid, and mixtures comprising two or more of these polyacid chlorides. Suitable polyamines include para-phenylene diamine (ppd), meta-phenylene diamine (mpd), 4,4'-diaminobiphenyl, ethylene diamine, 1,3-propane diamine, 1,6-hexanediamine, 1,10-decanediamine, 4,4'-diaminodiphenyl sulfone, 1,3,5-triaminobenzene, piperazine, cis-1,3,5-cyclohexanetriamine, and mixtures comprising two or more of these polyamines. Suitable organic solvents include hydrocarbon solvents, alcohol solvents, ketone solvents, ester solvents, ether solvents, amide solvents, and mixtures thereof. The interfacial polymerization reaction may be carried out at a temperature ranging from about 5° C. to about 60° C., preferably from about 10° C. to about 40° C.

In order to improve permeability and/or salt rejection, the polyamide membrane may be post-treated with an oxidizing solution, such as a sodium hypochlorite solution. The concentration of sodium hypochlorite in the solution may range from about 10 ppm to about 4000 ppm.

EXAMPLES

Examples 1-11

Post-treatment with 4-Nitrobenzenesulfonyl Chloride

Polyamide RO membrane were cut into 6"×12" size and then clamped between two aluminum hand-frames and sealed with 6 clamps around the edges. The membrane was rinsed with water for about 10 seconds, then treated with a reagent solution containing 4-nitrobenzenesulfonyl (nosyl) chloride in methanol solution as listed in Table 1 for the specified time (between 30 and 90 seconds) at ambient temperature, and let stand for 3 minutes. The reagent mixture was poured off the membrane from the same corner that it was administered. The membrane was then dried in a ventilated oven at 55° C. for 10 minutes, cooled to ambient temperature, and stored in a refrigerator until testing on a cross-flow testing bench.

Comparative Experiments 1-3

Control RO membranes were prepared as described above, except no post-treatment was performed.

Protocol For Testing Coated RO Membranes For NaCl Rejection And Permeability

Test coupons were cut and treated with a 40000 ppm NaCl solution (in DI water) at 800 psi at 20° C. for 1 hour. After this time, the permeate was collected, weighed and its conductivity measured to obtain the salt rejection and membrane permeability. The membrane was then treated with a sodium hypochlorite solution (70 ppm free chlorine in DI water) at 225 psi at 20° C. for 30 minutes. After this time, the membrane was rinsed with DI water for 0.5-1.0 h and again treated with a 40000 ppm NaCl solution at 800 psi at 20° C. for 1 hour. The permeate was again collected, weighed and its conductivity measured to obtain the salt rejection and membrane permeability. The post-chlorination samples were also analyzed by ICP (Inductively coupled plasma mass spectrometry) or azomethine/UV method for boron rejection characterization, using the method described in the Hach DR/2400 Spectrophotometer procedures manual.

Results are shown in Table 1. Without any nosyl chloride post-treatment, the control RO membrane had a boron rejection of 86.6% to 88.6% and salt passage of 99.3 to 99.4%. However, after the nosyl treatment, boron rejection increased to 91-97% and salt rejection increased to 99.6-99.9%.

TABLE 1

Membrane permeability, salt passage, and boron rejection performance (boron results characterized by ICP method)

| Ex. No. | Post-treatment Solution Composition (wt %) | | Reaction time (sec) | PVA wt % | Permeability (A-value) | % Salt Rej. % | Boron rejection % |
|---|---|---|---|---|---|---|---|
| | Nosyl | TEA | | | | | |
| 1 | 1 | 0.1 | 60 | 1 | 1.1 | 99.6 | 92.8 |
| 2 | 1 | 0.3 | 30 | 1 | 1.1 | 99.8 | 95.6 |
| 3 | 1 | 0.3 | 90 | 1 | 1.2 | 99.7 | 92.3 |
| 4 | 1 | 0.3 | 90 | 3 | 0.9 | 99.9 | 94.4 |
| 5 | 1 | 0.5 | 30 | 2 | 1.1 | 99.7 | 92.6 |
| 6 | 1 | 0.5 | 90 | 2 | 1.2 | 99.6 | 94.2 |
| 7 | 1 | 0.3 | 60 | 2 | 0.9 | 99.8 | 95.4 |
| 8 | 1 | 0.3 | 60 | 2 | 1.2 | 99.9 | 91.3 |
| 9 | 2 | 0.5 | 60 | 2 | 0.8 | 99.8 | 95.2 |
| 10 | 2 | 0.3 | 60 | 1 | 0.9 | 99.5 | 96.2 |
| 11 | 2 | 0.3 | 60 | 3 | 0.7 | 99.9 | 97.1 |
| Comp Ex. 1 | — | — | — | 1 | 1.7 | 99.4 | 88.3 |
| Comp Ex. 2 | — | — | — | 2 | 1.8 | 99.3 | 88.6 |
| Comp Ex. 3 | — | — | — | 3 | 1.8 | 99.4 | 86.6 |

Examples 12-16

Post-treatment with Other Agents

RO membranes were treated with 1,3-benzenedisulfonyl chloride (BDSC), 4-cyano benzenesulfonyl chloride (cyano BSC), and methanesulfonyl chloride. The membranes showed increased boron rejection compared to the control membranes.

Examples 17-31

In-situ Treatment with Benzenedisulfonyl Chloride

Examples 17-22

Procedure for Membrane Fabrication Using Handframe Coating Apparatus

Composite membranes were also prepared using a hand-frame coating apparatus consisting of a matched pair of frames in which the porous base membrane could be fixed and subsequently coated with a polyamide coating comprising a C3-C8 cyclic carbonyl compound and a C1-C8 amide compound. The following procedure was used. The porous base membrane was first soaked in deionized water for at least 30 minutes. The wet porous base membrane was fixed between two 8 inch by 11 inch plastic frames and kept covered with water until further processed. Excess water was removed from the porous base membrane and one surface of the porous base membrane was treated with 80 grams of an aqueous solution comprising meta-phenylenediamine (MPD) (2% by weight) and triethylammonium camphorsulfonate (TEACSA) (6% by weight), the upper portion of the frame confining the aqueous solution to the surface of the porous base membrane. After a period of 120 seconds, the aqueous solution was removed from the surface of the porous base membrane by tilting the assembly comprising the frame and the treated porous base membrane until only isolated drops of the aqueous solution could be observed on the surface of the treated porous base membrane. The treated surface was further treated by exposure to a gentle stream of air to remove isolated drops of the aqueous solution. The treated surface of the porous base membrane was then contacted with 150 grams of an organic solution comprising trimesoyl chloride (0.20% by weight) mesitylene (1.5% by weight), cyclohexanone (6% by weight) and benzenedisulfonyl chloride (weight % as shown in Table 2 below), in Isopar G solvent. Excess organic solution was then removed by tilting a corner of the frame and collecting the excess organic solution in a suitable collection vessel. The treated assembly was then placed in a drying oven and maintained at a temperature of 60° C. for a period of about 10 minutes after which the composite membrane was tested.

TABLE 2

Hand Frame Organic Coating Solutions

| Example No. | Organic Additve |
|---|---|
| 17 | 6% cycl + 1.5% mesitylene + 0% BDSC |
| 18 | 6% cycl + 1.5% mesitylene + 0.05% BDSC |
| 19 | 6% cycl + 1.5% mesitylene + 0.10% BDSC |
| 20 | 6% cycl + 1.5% mesitylene + 0.20% BDSC |
| 21 | 0% cycl + 1.5% mesitylene + 0% BDSC |
| 22 | 6% cycl + 1.5% mesitylene + 0.2% BDSC |

TABLE 3-continued

Pilot Coater Organic Coating Solutions

| Example No. | Organic Additve |
|---|---|
| 28 | 1% cycl + 1.5% mesitylene + 0% BDSC |
| 29 | 1% cycl + 1.5% mesitylene + 0.18% BDSC |
| 30 | 1% cycl + 1.5% mesitylene + 0.36% BDSC |
| 31 | 1% cycl + 1.5% mesitylene + 0.71% BDSC |

The membranes were tested using the protocol described for Examples 1-11.

Results are displayed in Table 4.

TABLE 4

Testing Conditions and Results for Examples 18-32

| | | | | | Pre-Chlorination | | Post-Chlorination | |
|---|---|---|---|---|---|---|---|---|
| Ex. No. | Rinse Pressure (psig) | Chlorination Pressure (psig) | Test Pressure (psig) | NaCl (ppm) | Permeability (A-value) | Passage (%) | Permeability (A-value) | Passage (%) |
| 17 | 225 | 225 | 225 | 2000 | 6.8 | 0.99 | 6.1 | 0.35 |
| 18 | 225 | 225 | 225 | 2000 | 6.4 | 0.63 | 5.8 | 0.25 |
| 19 | 225 | 225 | 223 | 2000 | 5.3 | 0.43 | 5.3 | 0.21 |
| 20 | 225 | 225 | 225 | 2000 | 2.8 | 0.31 | 43 | 0.21 |
| 21 | 225 | 225 | 300 | 32000 | 2.2 | 0.82 | 4.0 | 0.57 |
| 22 | 225 | 225 | 800 | 32000 | 2.1 | 0.30 | 3.8 | 0.30 |
| 23 | 115 | 115 | 115 | 500 | 2.1 | 0.30 | 12.3 | 0.87 |
| 24 | 115 | 115 | 115 | 500 | 24.4 | 2.91 | 25.3 | 1.27 |
| 25 | 115 | 115 | 115 | 500 | 14.6 | 0.91 | 26.2 | 0.85 |
| 26 | 115 | 115 | 115 | 500 | 3.9 | 0.78 | 27.4 | 1.26 |
| 27 | 115 | 115 | 113 | 500 | 6.7 | 0.81 | 27.8 | 0.94 |
| 28 | 115 | 115 | 115 | 500 | 14.1 | 0.37 | 14.3 | 0.69 |
| 29 | 115 | 115 | 115 | 500 | 7.3 | 1.15 | 16.5 | 0.86 |
| 30 | 115 | 115 | 115 | 500 | 6.3 | 0.72 | 19.3 | 0.69 |
| 31 | 115 | 115 | 115 | 500 | 5.6 | 1.42 | 23 | 0.94 |

Examples 23-31

Procedure for Membrane Fabrication Using Pilot Coater

The handframe procedure was duplicated using a pilot coating machine capable of coating a 12-inch wide web. A porous base membrane was fed through an aqueous coating bath composed of 2.9 wt % MPD and 6.6 wt % TEACSA in water. The porous base membrane coated on one side with the aqueous solution was passed through a rubber nip roller to remove excess fluid. The coated porous base membrane was then fed through an organic coating bath composed of a water-immiscible solvent, a polyacid halide, and the organic additives, as shown in Table 3. Following passage through the organic coating solution, the porous base membrane was passed through a dryer to remove solvent and water to provide the product composite membrane.

TABLE 3

Pilot Coater Organic Coating Solutions

| Example No. | Organic Additve |
|---|---|
| 23 | 0% cycl + 1.5% mesitylene + 0% BDSC |
| 24 | 1% cycl + 1.5% mesitylene + 0% BDSC |
| 25 | 1% cycl + 1.5% mesitylene + 0.18% BDSC |
| 26 | 1% cycl + 1.5% mesitylene + 0.36% BDSC |
| 27 | 1% cycl + 1.5% mesitylene + 0.71% BDSC |

A dramatic and simultaneous increase in % rejection and A-value after chlorination was seen in many cases when BDSC was present.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for preparing a composite polyamide membrane comprising contacting under interfacial polymerization conditions an organic solution comprising trimesoyl chloride with an aqueous solution comprising phenylene diamine to form a composite polyamide membrane, said contacting being carried out on a surface of a porous base membrane, said organic solution further comprising cyclohexanone and an aryl sulfonyl halide selected from 1,3-benzenedisulfonyl chloride and 1,3,6-naphthalenetrisulfonyl chloride; and concentration of the aryl sulfonyl halide in the aqueous solution ranging from about 0.18% to about 0.71% by weight; and contacting the composite polyamide membrane with a sodium hypochlorite solution to form a treated composite polyamide membrane having salt passage less than or equal to 1.26% and A-value greater than or equal to 16.5.

2. A method according to claim 1, wherein the concentration of free chlorine in the sodium hypochlorite solution ranges from about 10 ppm to about 4000 ppm.

3. A method according to claim 1, wherein the aryl sulfonyl halide is 1,3,6-naphthalenetrisulfonyl chloride.

4. A method according to claim 1, wherein the aryl sulfonyl halide is 1,3-benzenedisulfonyl chloride.

5. A composite membrane prepared by the method of claim 1.

\* \* \* \* \*